Oct. 21, 1958  A. A. GONZALEZ  2,857,435
RECOVERY OF MONOALKYL ETHERS OF DIETHYLENE
GLYCOL FROM SOLUTIONS
Filed Feb. 10, 1958
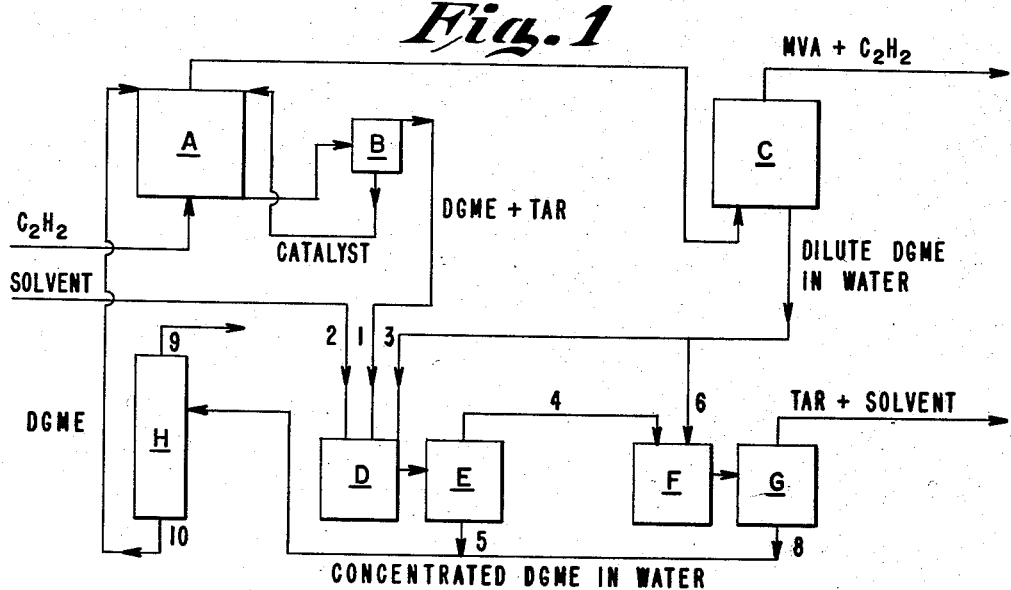
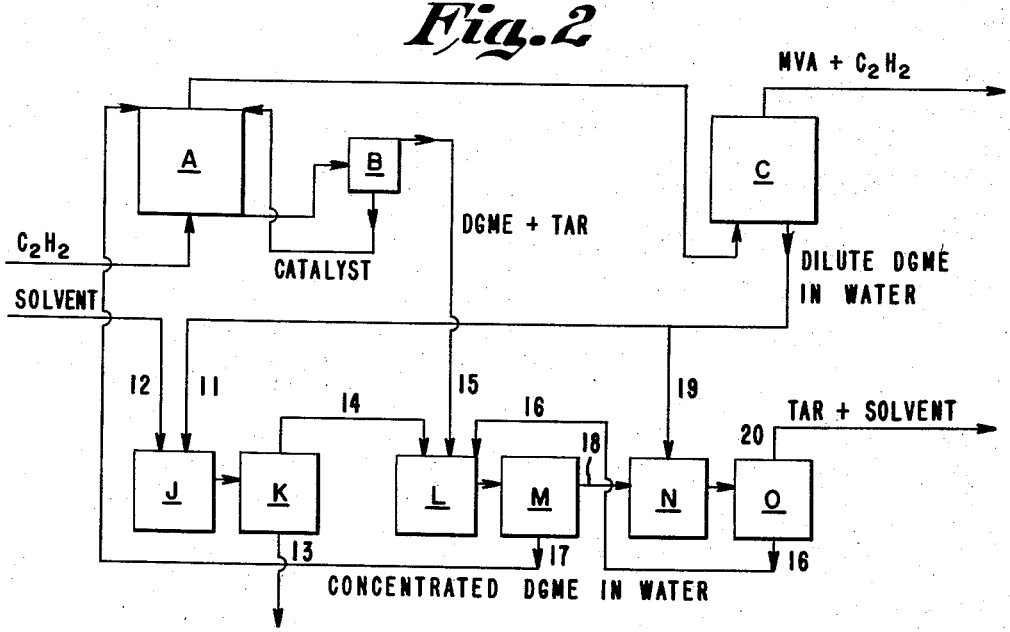
INVENTOR
ALFRED A. GONZALEZ
BY *Walter H. Steinbaugh*
ATTORNEY

United States Patent Office 2,857,435
Patented Oct. 21, 1958

2,857,435

RECOVERY OF MONOALKYL ETHERS OF DIETHYLENE GLYCOL FROM SOLUTIONS

Alfred A. Gonzalez, Anniston, Ala., assignor to E. I. du Pont de Nemours and Company, Wilmington, Del., a corporation of Delaware Application February 10, 1958, Serial No. 714,308

4 Claims. (Cl. 260—616)

This invention relates to the manufacture of monovinylacetylene, an intermediate for polychloroprene synthetic rubber. Monovinylacetylene is made by the polymerization of acetylene in the presence of an aqueous catalyst containing cuprous chloride. More particularly, the present invention is directed to an embodiment of this process in which the catalyst contains a diethylene glycol ether and to a method for recovering this ether for re-use.

Certain important improvements result when the catalyst solution commonly used for polymerizing acetylene to monovinylacetylene, consisting of cuprous chloride dissolved in aqueous potassium chloride solution, is modified by adding 1.5 to 20% (based on the weight of the catalyst solution) of a monoalkyl ether of diethylene glycol. Increased rates of conversion of the acetylene and increased yields of monovinylacetylene, or, in other words, decreased formation of undesirable by-products is achieved according to this process. Other improvements are effected by the solvent action of the diethylene glycol ethers upon the tarry by-products which are formed in the polymerization of the acetylene. Without the ether, these tarry products accumulate on the walls of the reactor and of tubes and orifices through which the catalyst circulates, and make frequent shut-downs for cleaning necessary. The solution of the tar in the ether is removed from the reactor and the tar is partly precipitated with water, and the ether is recovered and purified by distillation and returning the ether to the catalyst. This series of recovery steps, in addition to adding much to the expense, involves considerable loss of the ether by decomposition and, more important, a serious risk in heating the tar, which remains to some extent in the aqueous ether phase and which may contain explosive peroxides.

It is an object of the present invention to provide a process for recovering diethylene glycol ethers from tar in the manufacture of monovinylacetylene. It is a further object of the present invention to re-use ethers in such a manner that the recovered monoalkyl ether may be recycled for use in the manufacture of additional monovinylacetylene. These and other objects will become apparent in the following description and claims.

More particularly, the present invention is directed to a process for recovering monoalkyl ethers of diethylene glycol from solutions therein of tarry acetylene polymers formed in the manufacture of monovinylacetylene, said process comprising the steps of mixing the solution of the tar in the monoalkyl ether with dilute hydrochloric acid and a liquid aromatic hydrocarbon solvent, separating the mixture into a lighter layer comprising tar and solvent and a heavier layer comprising the monoalkyl ether and the dilute hydrochloric acid, followed by separating and recycling said monoalkyl ether layer for the manufacture of additional monovinylacetylene.

Preferably, in the process of the present invention, the monoalkyl ether solution to be treated contains 3 to 30% of tar. Also, it is preferable that 3 to 5 parts of dilute acid and ⅓ to 3 parts of aromatic hydrocarbon solvent, per part of ether solution, be added. The concentration of the dilute acid is preferably between 2 and 15% by weight of the water and the temperature in the mixing and settling operations is between 20 and 65° C. Conditions outside these preferred limits are also operable.

The dilute hydrochloric acid used for scrubbing the exit gas stream from the reactor and containing the dissolved monoalkyl ether is often conveniently used as the main source of the dilute acid added to the monoalkyl ether solution of tar, and the ether contained in this acid solution is thus largely recovered. If the solution of tar in aromatic hydrocarbon from the above separations still contains some ether, it may advantageously be treated with another portion of dilute acid or of the acidic dilute aqueous solution of the ether. A modification of this two-stage recovery is to add the dilute aqueous solution of the ether only to the second stage and use the aqueous phase produced in the second stage as the aqueous addition for the first stage. The recovered water solution of the ether may be returned for re-use to the reactor, with or without removal of the water by distillation.

The invention is illustrated by Figures I and II of the accompanying drawing, referring respectively to Examples 2 and 4. These figures are flow sheets in which the pertinent features of the process used for making monovinylacetylene are also represented, in order to show the origin and disposition of the streams involved in the present invention. In actual practice, batteries of several reactors, scrubbers, etc., are used but are represented in the drawings as single pieces of equipment. In these figures, the designations MVA and DGME represent monovinylacetylene and diethylene glycol monobutyl ether, respectively.

Representative examples illustrating the present invention follow, showing the effects of varying the acid concentration, the ratio of acid to solvent, and the temperature.

*Example 1*

One volume of a 5% by weight solution of the by-product tar in the butyl ether of diethylene glycol is agitated, by passage through a centrifugal pump, with one volume of a mixture of aromatic and some aliphatic hydrocarbons boiling between 85° and 155° C. and 5 volumes of 10% hydrochloric acid. The temperature is about 35° C. After separating into two layers on standing, the lower aqueous layer is found to contain 92% of the butyl ether originally added.

When 2% hydrochloric acid is used as above instead of 10%, 86% of the ether is recovered. When only water is used, only 79% is recovered. When the temperature is about 65° C., instead of 35°, about 90% of the ether is extracted. Using these conditions and 3 volumes of solvent, only 64% is extracted.

The following examples illustrate the application of the principle of the invention to the specific problem of separating and recovering the diethylene glycol ethers used in the manufacture of monovinylacetylene, wherein, according to the process heretofore referred to, the aqueous catalyst solution of cuprous chloride and potassium chloride contains a dispersed or suspended diethylene glycol monoalkyl ether. As shown in Fig. I and Fig. II, this catalyst, after circulating through the reactor A in which it is brought in contact with acetylene, passes to a separator B in which an upper layer, containing the tarry by-products dissolved in ether, separates and is continuously removed and treated according to the present invention, as shown below. The lower, aqueous catalyst solution, is returned from the separator to the reactor. The gases, chiefly acetylene and monovinylacetylene, from the reactor, containing vapor of diethylene glycol monobutyl ether, are scrubbed in C with dilute hydrochloric acid, which removes the ether. This scrubbing liquid containing the ether, is continuously removed and used, as described below, to precipitate the tar. At the same time its ether content is recovered.

Example 2

The stream 1 see Fig. I from the tar separator B, consisting of 285 parts by weight of diethylene glycol monobutyl ether and 15 parts by weight of tar per hour, is mixed, by passing through a pump D, with 250 parts per hour of a mixture of aromatic hydrocarbons boiling between 85° and 155° C. (2), and another stream 3 consisting of 1200 parts of water, 120 parts of hydrogen chloride and 54 parts of butyl ether, which is part of the effluent from the acid scrubber C. The mixture at about 50° C. is passed to a settling tank E from which the upper layer is continuously removed as a stream 4 consisting of the 250 parts of aromatic solvent, the 15 parts of tar per hour, and 26 parts of diethylene glycol monobutyl ether per hour. The lower layer gives 313 parts of the butyl ether per hour, with the 1200 parts of water and 120 parts of hydrogen chloride (stream 5). Stream 4 is mixed in F with a second stream 6 from the scrubber, containing 25 parts of the ether per hour and is then separated in G into two layers as before, the temperature again being about 50° C. The upper layer from this separation contains the 250 parts of solvent per hour, stream 7, along with the 15 parts of tar but only 9 parts of the ether, out of a total of 364 parts fed. This may be safely burned, since the tar which may under exceptional circumstances contain explosive compounds, is well diluted with the hydrocarbon solvent. The lower layer gave stream 8 containing 42 parts of either, 600 of water, and 65 of hydrogen chloride. 5 and 8 are introduced as one stream to a packed distillation column H, operating at a pressure of 30 mm. of mercury, with a reboiler at the bottom at 60° C. and a reflux condenser at the top. The overhead fraction consists of 1780 parts of water, and 181 parts of hydrogen chloride, and 2 parts of the ether per hour, stream 9. This may be returned to the scrubber. The undistilled bottoms consist of 355 parts of the recovered ether with 4 parts of hydrogen chloride and 20 of water per hour, stream 10. This is returned to the reactor.

Example 3

The extraction with dilute hydrocarbon solvent and hydrochloric acid is carried out as in Example 2, except that the lower layer consisting of diethylene glycol monobutyl ether, water and hydrogen chloride is returned directly to the reactor in which the monovinylacetylene is being made. Thus, referring to Fig. I, part or all of streams 5 and 8 are returned to reactor A. In order to maintain the desired concentration of hydrochloric acid in the reactor, it is sometimes necessary to process only part of the solution from the acid scrubber.

Example 4

The following example illustrates another method for recovering the butyl ether of diethylene glycol from both the tar solution coming from the reactor and the acid solution used for scrubbing the effluent gas. The temperature of each mixing and separating operation is 65° C. Part of the acid solution from the scrubber C, consisting of 884 parts by weight per hour of water containing in solution 52 parts of the butyl ether of diethylene glycol and 80 parts of hydrogen chloride stream 11, is mixed in the agitated pot J with the predominantly aromatic hydorcarbon solvent, boiling between 85° and 155° C. and used in the preceding examples, at the rate of 310 parts by weight of the solvent per hour, stream 12. This mixture then passes to a settling tank K from which the lower aqueous layer is continuously removed as stream 13 and discarded and the upper layer consisting of solvent and ether is removed as stream 14 and mixed in L with stream 15, the tar solution from the reactor, consisting of 331 parts of the butyl ether and 20.5 parts of tar per hour, and with stream 16 of treated scrubber solution consisting of 836 parts of water, 76 of hydrogen chloride, and 127 parts of the butyl ether per hour, the preparation of which is described below. After passing to a settling tank M, the lower layer is withdrawn as a stream consisting of 351 parts of the butyl ether, 836 parts of water, 76 of hydrogen chloride and 4.5 parts of tar per hour and is returned directly to the reactor A without distillation to remove water and acid, since it contains no more acid and water than is required to be added to the reactor. The effluent 18 representing the upper layer from this separation consists of 120 parts of ether, 310 parts of solvent, and 16 parts of tar per hour and is mixed in N with stream 19 from the acid scrubber consisting of 52 parts of ether, 836 parts of water, and 76 parts of hydrogen chloride per hour. After settling in O, this gives rise to stream 16 already described, which is returned to L for further treatment, and stream 20 consisting of 310 parts per hour of the solvent, 16 of tar and 45 of ether. This may be disposed of by burning.

Example 5

The process of Example 4 may be simplified with the elimination of J and K by omitting the extraction of stream 11 with solvent, introducing stream 12 of solvent directly into L, and discarding stream 11.

Although the monobutyl ether of diethylene glycol is preferred, other simple monoalkyl ethers may be used, such as ethyl and methyl. Suitable tar concentrations and temperatures and suitable ratios of the added hydrocarbon solvent and of the dilute acid to the ether solution, are given in the above discussion of the specific embodiments of the invention. The quantities given in the specific example are particularly preferred. Any volatile aromatic hydrocarbon may be used, such as benzene, xylene, or particularly toluene. They may be diluted with up to 50% of aliphatic hydrocarbons in the same boiling range. The mixture of predominantly aromatic hydrocarbons used in the example is particularly suitable because of its cheapness.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The process for recovering monoalkyl ethers of diethylene glycol from solutions therein of tarry acetylene polymers formed in the manufacture of monovinylacetylene, said process comprising the steps of mixing the solution of the tar in the monoalkyl ether with dilute hydrochloric acid and a liquid aromatic hydrocarbon solvent which is predominantly aromatic, separating the mixture into a lighter layer comprising tar and solvent and a heavier layer comprising the monoalkyl ether and the dilute hydrochloric acid, followed by separating and recycling said monoalkyl ether layer for the manufacture of additional monovinylacetylene.

2. A process for recovering monoalkyl ethers of diethylene glycol from solutions therein of tarry acetylene polymers formed in the manufacture of monovinylacetylene, the monoalkyl ether solutions containing from 3 to 30% of tar, said process comprising the steps of mixing the solution of the tar in the monoalkyl ether with from 3 to 5 parts of dilute hydrochloric acid and from ⅓ to 3 parts of a liquid and predominantly aromatic hydrocarbon solvent, per part of ether solution, the concentration of the dilute acid being between 2 and 15% by weight of water, separating the mixture into the lighter layer comprising tar and solvent and a heavier layer comprising the monoalkyl ether and the dilute hydrochloric acid, the temperature in the mixing and separation steps being maintained within the range of 15 to 75° C., followed by separating and recycling said monoalkyl ether layer for the manufacture of additional monovinylacetylene.

3. A process for recovering monoalkyl ethers of diethylene glycol from solutions therein of tarry acetylene polymers formed in the manufacture of monovinylacetylene, the monoalkyl ether solutions containing from 3 to 30% of tar, said process comprising the steps of mixing the solution of the tar in the monoalkyl ether with from 3 to 5 parts of dilute hydrochloric acid and from ⅓ to 3 parts of a liquid and predominantly aromatic hydrocarbon solvent, per part of ether solution, the concentration of the dilute acid being between 2 and 15% by weight of water, separating the mixture into the lighter layer comprising tar and solvent and a heavier layer comprising the monoalkyl ether and the dilute hydrochloric acid, the temperature in the mixing and separation steps being maintained within the range of 15 to 75° C., separating said monoalkyl ether layer, followed by mixing said tar and solvent layer with an additional 2 to 15% dilute hydrochloric acid and allowing the two resulting phases to separate, the resulting lower aqueous layer containing additional extracted glycol ether being united with the original layer comprising the monoalkyl ether and the dilute hydrochloric acid, followed by recycling for the manufacture of additional monovinylacetylene.

4. A process for recovering monoalkyl ethers of diethylene glycol from solutions therein of tarry acetylene polymers formed in the manufacture of monovinylacetylene, the monoalkyl ether solutions containing from 3 to 30% of tar, said process comprising the steps of mixing the solution of the tar in the monoalkyl ether with from 3 to 5 parts of dilute hydrochloric acid, said acid containing a monoalkyl ether of diethylene glycol recovered from the monovinylacetylene gaseous reaction products by scrubbing said gaseous reaction products with said acid, and, from ⅓ to 3 parts of a liquid and predominantly aromatic hydrocarbon solvent, per part of ether solution, the concentration of the dilute acid being between 2 and 15% by weight of water, separating the mixture into the lighter layer comprising tar and solvent and a heavier layer comprising the monoalkyl ether and the dilute hydrochloric acid, the temperature in the mixing and separation steps being maintained within the range of 15 to 75° C., followed by separating and recycling said monoalkyl ether layer for the manufacture of additional monovinylacetylene.

No references cited.